Jan. 21, 1958   J. R. OISHEI ET AL   2,820,628
WINDOW OPERATOR
Filed March 10, 1955
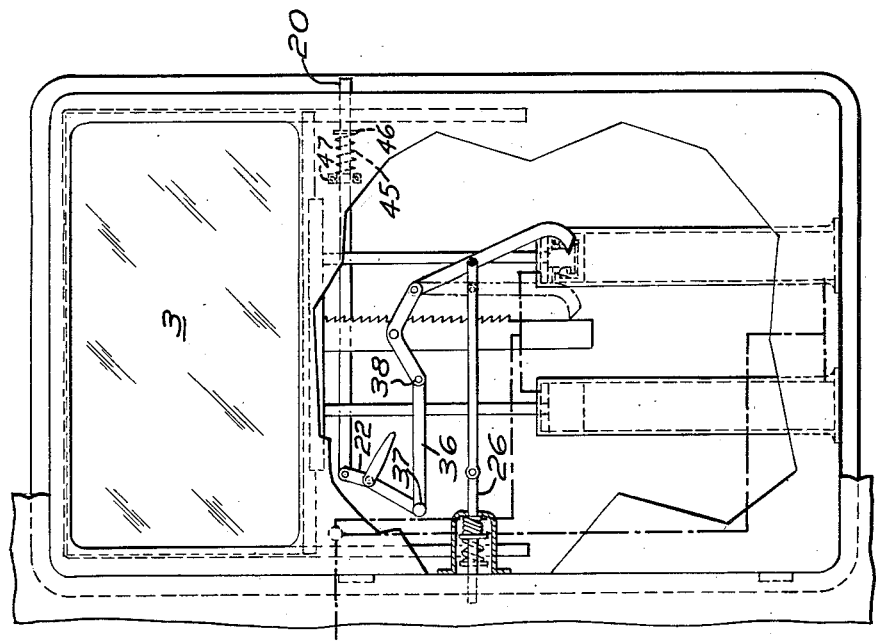
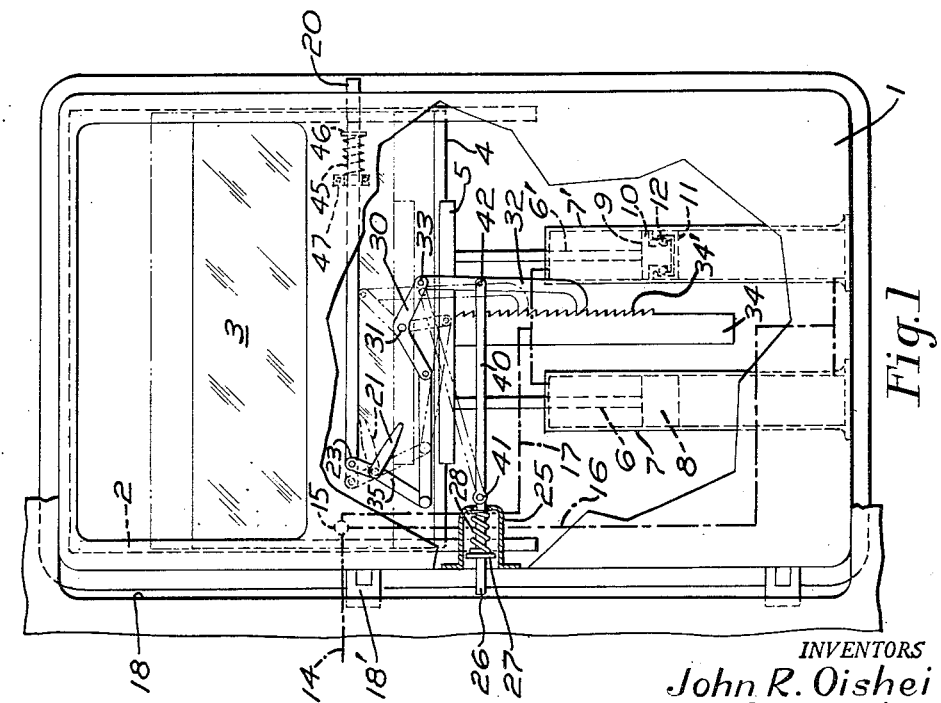
INVENTORS
*John R. Oishei*
and *William C. Riester*
BY: *Beau, Brooks, Buckley & Beau.*
ATTORNEYS.

United States Patent Office 2,820,628
Patented Jan. 21, 1958

2,820,628

WINDOW OPERATOR

John R. Oishei, Buffalo, and William C. Riester, Eggertsville, N. Y., said Riester assignor to Trico Products Corporation, Buffalo, N. Y.

Application March 10, 1955, Serial No. 493,501

9 Claims. (Cl. 268—125)

This invention relates generally to the window operator art, and more particularly to a new and useful means for closing a vehicle window.

Various automatic window operator mechanisms have been proposed for use in place of the usual hand operated crank, such automatic mechanisms usually having either a fluid pressure operated motor or an electric motor as the source of motive power and requiring only the manipulation of a readily accessible control button to raise and lower the window as desired. Such automatic window operators add greatly to the convenience of the vehicle occupants, and particularly the vehicle operator, and they have been widely adopted and used in recent years.

However, the fluid pressure operated motors used for this purpose require that the vehicle engine be running to provide the necessary fluid pressure or suction, as the case may be, and electrically operated window mechanisms often require that the ignition switch be on. This means that when a vehicle is equipped with such automatic window operator mechanisms and the vehicle operator turns off the ignition and steps out of the car before discovering that the window is in an open position, he must, if he desires to close the window because of inclement weather or to prevent theft of articles from the car, step back into the car and turn on the ignition switch and possibly even start the motor, in order to actuate the window operator.

Accordingly, it is a primary object of this invention to provide a window closing mechanism adapted for use in conjunction with such automatic window operating mechanisms and operable when the vehicle door is open to enable closing of the window panel without reentering the car and without turning on the ignition switch and starting the vehicle engine.

A further object of this invention is to provide a vehicle window closing mechanism as aforesaid which is operable by the usual door latch handle when the vehicle door is open, the mechanism being rendered inoperative when the door is closed to permit the usual door unlatching operation with the latch handle.

A window closing mechanism in accord with this invention is characterized by the provision of means operable by the door latch handle to close the door window with a step-by-step motion, such means being rendered inoperative automatically upon closing the door to enable the usual door opening operation.

The foregoing and other objects and advantages of a vehicle window closing mechanism in accord with this invention will become clearly apparent from the ensuing detailed description of a preferred embodiment thereof, taken together with the accompanying drawing wherein:

Fig. 1 is a generally diagrammatic view illustrating a preferred form of window closing mechanism in accord with this invention; and Fig. 2 is a view corresponding to Fig. 1 but showing the mechanism in inoperative position with the door closed.

Referring now to the accompanying drawing, numeral 1 represents a vehicle door having a guide way 2 receiving the vertically slidable window pane 3. The window pane 3 is provided along its bottom edge with a border strip 4 secured in a channeled bracket 5 which is connected to the piston rods 6 and 6' of a pair of fluid pressure operated motors 7 and 7', respectively. The motors 7 and 7', comprising part of an automatic window operator, are of a conventional type such as illustrated for example in United States Patent 2,515,712, and are secured within the door panel, the motors being interconnected for joint operation as by the bracket 5.

Motor 7 has a piston element 8 movable therein and joined to the rod 6, and motor 7' has a piston element 9 movable therein and comprising a self energizing lock or clutch constructed, for example, in accord with the teaching of the aforesaid patent. To this end, piston element 9 has a section 10 carried by rod 6' and a floating section 11, with rollers 12 between the sections, the same being constructed and arranged in a manner such that the window pane 3 can always be lifted but cannot be lowered except by motors 7 and 7', the piston section 11 expanding against the adjacent cylinder wall to prevent lowering of the window pane either manually or because of the weight thereof. Motors 7 and 7' can be operated by either superatmospheric or subatmospheric pressure, and in each case the motors are connected to a suitable source of fluid pressure or of suction, such as the intake manifold of the motor vehicle engine, not illustrated, by a conduit 14 connecting a control switch 15 to the source of pressure or suction, a conduit 16 extending between switch 15 and motors 7 and 7' on the corresponding side of the pistons therein and a conduit 17 extending between switch 15 and motors 7 and 7' on the other side of the pistons therein. In operation, both sides of both pistons 8 and 9 are normally exposed either to suction or to the atmosphere or to superatmospheric pressure, and when it is desired to move the window pane switch 15 is manipulated to create a pressure differential across the pistons causing operation of the motors in a known manner.

When the vehicle engine has been turned off the above described automatic window operator is inoperative, and this invention provides a mechanism for closing the window under such circumstances, as follows.

The door 1 is hinged to a pillar 18 comprising a part of the vehicle body, as by the hinges 18', whereby the door may be swung open and closed. The door 1 is provided with the usual latch 20 adapted for operation in the usual manner by the latch handle 21 having an arm 22 pivoted to the latch lever as at 23, whereby upon rotating handle 21 in the usual manner to its broken line position in Fig. 1 latch 20 will be retracted to open the door.

In a preferred embodiment of this invention, a bracket 25 is mounted interiorly of the door on the hinge side thereof and a rod 26 is slidable therein. Rod 26 has a shoulder 27 thereon and a spring 28 extends between the inner wall of bracket 25 and shoulder 27 for normally urging rod 26 to its extended position as illustrated in Fig. 1. A bell crank lever 30 is pivoted in the door, as at 31, and a pawl member or dog 32 is pivoted to the end of one arm of the crank 30, as at 33. At its lower end, dog 32 is adapted to engage the teeth 34' of a ratchet member 34 which is fixed to the bracket 5 and depends therefrom.

The door latch handle 21 has another crank arm 35 pivoted to a link 36, as at 37, which link is in turn pivoted to the outer end of the other arm of bell crank 30, as at 38. Rod 26 is pivoted to a link 40, as at 41, and the opposite end of link 40 is pivoted at 42 to the dog 32 at a point thereon spaced from its pivotal support 33.

In operation, when the door 1 is closed the rod 26 bears against the hinge pillar 18 and is pushed inwardly to its fully retracted position illustrated in full lines in Fig. 2. This moves link 40 inwardly, pushing dog 32 away from ratchet 34 when the rod 26 is in this fully retracted position, as illustrated in full lines in Fig. 2, whereby the window closing mechanism of this invention is held inoperative.

When it is desired to open door 1, the door latch handle 21 is simply pivoted in the usual manner to its broken line position in Fig. 1, retracting latch 20 and permitting door 1 to be swung open. As the door is opened, spring 28 urges rod 26 to its extended position, and, acting through link 40, pulls dog 32 into engagement with the teeth 34' of rack 34, as illustrated in full lines in Fig. 1.

Then, if window pane 3 is in a lowered position and the vehicle engine is off, the window glass 3 can be raised to close the window opening by oscillating the latch handle 21 in the same manner as when unlatching the door. Thus, by moving latch handle 21 to its broken line position in Fig. 1, as though unlatching the door, it acts through crank arm 35, link 36, crank 30 and pawl 32 to lift ratchet 34 and window pane 3 upwardly, the parts assuming the broken line position thereof illustrated in Fig. 1. When handle 21 is returned to its normal full line position, usually by a spring, diagrammatically illustrated at 45 as extending between a shoulder 46 on latch 20 and a bracket 47 fixed to the door, forming part of the usual door latch, dog 32 slides over teeth 34' and spring 28 yields to permit such action. Handle 21 is repeatedly oscillated in the aforesaid manner until window pane 3 assumes the desired position, and it will be noted that spring 28 and link 40 yieldably urge dog 32 into positive engagement with the teeth 34' of ratchet 34.

When the window has been raised to the desired position, door 1 can be closed and the rod 26 will be pushed inwardly to its retracted position rendering the window lifting mechanism of this invention inoperative and enabling normal operation of the door latch handle 21 and of the fluid motor automatic window operator. Of course, the window pane position can be adjusted automatically even when the door is in open position, if the power is on, because of the yielding engagement between pawl 32 and ratchet 34.

Therefore, it will be seen that the instant invention fully accomplishes its aforesaid objects, and adds greatly to the convenience of the vehicle operator by enabling closing of the window from exteriorly of the car when the engine has been shut off. The operator need only continue oscillating the latch operating lever 21 through its unlatching movement to raise the window. The window closing arrangement of this invention enables closing of the window even in the event of a power system failure, and also can be used to assist the power system motor in breaking the ice seal which occasionally forms between the window glass and the felt channel liner around the window opening.

While only a preferred embodiment of the instant invention has been disclosed herein, it will be appreciated that the invention is not necessarily limited to the various details of such embodiment and it is intended that the scope of this invention be defined by the appended claims.

Having fully disclosed and completely described the instant invention, together with its mode of operation, what is claimed as new is:

1. A vehicle window closing mechanism comprising, in combination with a vehicle door mounted for movement between open and closed positions with respect to an adjacent vehicle body part and having a window member movable therein between open and closed positions, a ratchet member connected to said window member for movement therewith, a pawl member mounted for reciprocating movement in said door and adapted upon its stroke in one direction to engage said ratchet member and move said window member toward its closed position, an actuating lever pivotally mounted on said door, means connecting said actuating lever to said pawl member for reciprocating the latter upon oscillating the former, means for holding said window member in adjusted position, and means automatically disengaging said pawl member and said ratchet member whenever said door is in its closed position.

2. A vehicle window closing mechanism comprising, in combination with a door member hinged to an adjacent vehicle body part for opening and closing movements relative thereto and carrying a window member movable between open and closed positions, a ratchet member connected to said window member for movement therewith, a reciprocative pawl member adapted during its stroke in one direction to engage said ratchet member and thereby move said window member toward its closed position, actuating lever means mounted on said door member for oscillating movement, means connecting said lever means to said pawl member whereby oscillation of the former reciprocates the latter, means operable to hold said window member against movement toward its open position, and means rendering said mechanism inoperative when said door member is in its closed position, said last named means including a member connected to said pawl member and spring biased toward an extended position exteriorly of said door member causing yieldable engagement of said pawl and ratchet members when said door member is in an open position and engaging said adjacent vehicle body part and retreating against its spring bias to hold said pawl member out of engagement with said ratchet member upon movement of said door member to its closed position.

3. A window closing mechanism comprising, in combination with a door member hinged for opening and closing movement relative to an adjacent vehicle body part and having a window member movable therein between open and closed positions, a door latch member engaging said body part to hold said door member in closed position, and an actuating lever for releasing said latch member to permit opening movement of said door member, a ratchet member connected to said window member for movement therewith, a pawl mounted for reciprocating movement in said door member and adapted during its stroke in one direction to engage said ratchet member and move said window member toward its closed position, means connecting said actuating lever to said pawl for reciprocating the latter upon latch member releasing movement of the former, and means operable to hold said pawl out of engagement with said ratchet member when said door member is in its closed position, whereby said door member is unlatched by said actuating lever in the usual manner without moving said window member, and whereby said window member can be closed by continued operation of said actuating lever when said door member is in an open position.

4. A vehicle window closing mechanism comprising, in combination with a vehicle door assembly including a door member hinged for opening and closing movement with respect to an adjacent vehicle body part, a window member movable in said door member between open and closed positions, a latch mechanism for holding said door member in closed position, and an actuating lever movable to unlatch said door member to enable opening thereof, a ratchet member connected to said window member for movement therewith, a reciprocating pawl member adapted to engage said ratchet member and therethrough to lift said window member toward its closed position with a step-by-step motion, connecting linkage between said actuating lever and said pawl member whereby repeated unlatching movement of said actuating lever reciprocates said pawl member to move said window member to its closed position, means holding said window member against downward movement, and means rendering said pawl member inoperative when said door member is in closed position, said last named means including a push-pull member adapted to extend through a side edge of said door member and pivotally connected to said pawl member, said push-pull member engaging said body part upon closing movement of said door member and retracting to hold said pawl member out of engagement with said ratchet member, and spring means biasing said push-pull member toward an extended position yieldably engaging said pawl member with said ratchet member.

5. In combination with a vehicle door assembly including a door member hinged for opening and closing movement relative to an adjacent body part, a latch for holding said door member in closed position, an actuating lever for selectively releasing said latch to permit opening movement of said door member, a window member movable in said door member between open and closed positions, and a window member operator mounted in said door member and including a motor selectively operable to open and close said window member and means for holding said window member against opening movement from its adjusted position other than by operation of said motor, a manually operable auxiliary mechanism for moving said window member in a closing direction comprising, ratchet means operable when engaged to close said window member, means connecting said latch actuating lever to said ratchet means for operating the latter to close said window member upon latch releasing movement of said lever, and means automatically operable to disengage said ratchet means when said door member is in closed position and to engage said ratchet means when said door member is in an open position.

6. In combination with a vehicle door assembly including a door member hinged for movement between open and closed positions with respect to an adjacent vehicle body part, a latch for holding said door member in closed position, a latch actuating lever for unlatching said door member, a window member movable in said door member between open and closed positions, and an automatic window member operating mechanism including a motor mounted in said door member and selectively operable to adjust the position of said window member and means operable to hold said window member against opening movement out of adjusted position excepting by said motor, an auxiliary window member closing mechanism comprising a ratchet device operable when engaged to impart a closing movement to said window member and including a ratchet member movable with said window member and a reciprocative pawl, means connecting said pawl to said latch actuating lever for reciprocating the former by latch releasing movement of the latter, and means disengaging said ratchet device automatically upon closing said door member and yieldably engaging the same upon opening said door member, said means including push-pull rod means pivotally connected to said pawl and spring urged exteriorly of said door member for contact with said body part, said rod yieldably engaging said pawl with said ratchet member when extended and retreating against the urging of its spring to disengage said pawl from said ratchet member upon closing said door member.

7. A vehicle window closing mechanism comprising, in combination with a vehicle door assembly including a door member mounted for opening and closing movement relative to an adjacent body part, a latch for releasably holding said door member in closed position relative to said body part, an actuating lever movable to release said latch and enable opening movement of said door member, and a window member movable in said door member between open and closed positions, a window member lifting mechanism connected to said actuating lever for operation by latch-releasing movement thereof and operable when engaged to move said window member toward its closed position, and means automatically disengaging said lifting mechanism when said door member is in closed position.

8. A window operating mechanism for the window of an automobile door, the latter having a door latch and means including a hand crank to retract the same, said mechanism comprising, in combination with the door, the window and the hand crank, a fluid powered primary operator connected and arranged to open and close the window, said primary operator including means locking the window against manual opening while permitting manual closing thereof independently of said primary operator, a secondary operator normally detached from the window when the door is closed and operable by the hand crank when the door is open to close the window independently of said primary operator, and means automatically disengaging the secondary operator from the window by and upon closing the door thereby to free the window for power actuation by said primary operator.

9. In a vehicle door assembly including a door member mounted for movement between open and closed positions relative to an adjacent body part, a latch for releasably holding said door member in closed position, an actuator lever movable to release said latch and enable movement of said door member to an open position, and a window member movable in said door member between open and closed positions, a window closing mechanism arranged to move said window member toward closed position upon latch releasing movement of said actuator lever, and means for disengaging said mechanism.

References Cited in the file of this patent

UNITED STATES PATENTS

| | | |
|---|---|---|
| 1,740,733 | Hansen | Dec. 24, 1929 |
| 2,418,031 | Horton | Mar. 28, 1947 |
| 2,514,272 | Winkelmann | July 4, 1950 |